United States Patent
Venkatakrishnan et al.

(10) Patent No.: US 8,560,133 B2
(45) Date of Patent: Oct. 15, 2013

(54) ENERGY SMART SYSTEM

(75) Inventors: Natarajan Venkatakrishnan, Louisville, KY (US); Kevin Farrelly Nolan, Louisville, KY (US); David C. Bingham, Louisville, KY (US); David Joseph Najewicz, Prospect, KY (US)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 12/873,386

(22) Filed: Sep. 1, 2010

(65) Prior Publication Data
US 2012/0053740 A1      Mar. 1, 2012

(51) Int. Cl.
*G05D 3/12*   (2006.01)
*G05B 13/00*  (2006.01)

(52) U.S. Cl.
USPC .......................................... 700/291; 700/275

(58) Field of Classification Search
USPC .................. 700/275, 276, 286, 291, 295–297
See application file for complete search history.

(56) References Cited

U.S. PATENT DOCUMENTS

| | | | |
|---|---|---|---|
| 2007/0174083 A1* | 7/2007 | Silverman et al. | 705/1 |
| 2008/0281473 A1* | 11/2008 | Pitt | 700/291 |
| 2009/0281677 A1* | 11/2009 | Botich et al. | 700/295 |
| 2009/0319090 A1* | 12/2009 | Dillon et al. | 700/291 |
| 2011/0004350 A1* | 1/2011 | Cheifetz et al. | 700/276 |

* cited by examiner

*Primary Examiner* — Sean Shechtman
(74) *Attorney, Agent, or Firm* — Global Patent Operation; Marc A. Vivenzio

(57) ABSTRACT

Apparatus and method for managing energy of a home or other structure are disclosed. An energy management system for a home network comprises a central device controller configured to communicate with energy consuming devices, energy generation devices and storage devices at a home. Power/energy measuring devices provide consumption measurements for the home and each device to the controller. A user interface has a client application configured to provide information to a user/consumer and to an energy provider/utility about energy consumption, energy generation and storage. An energy profile and a carbon footprint of an individual's home are generated along with recommendations for energy savings and/or possible addition of on site generation or energy storage.

9 Claims, 2 Drawing Sheets

ENERGY SMART SYSTEM

BACKGROUND

This disclosure relates to energy management, and more particularly to electrical device control methods and electrical energy consumption systems. The disclosure finds particular application to energy management of energy consuming devices, or appliances, for example, dishwashers, clothes washers, dryers, HVAC systems, etc.

In order to reduce high peak power demand, many utilities have instituted time of use (TOU) metering and rates, which include higher rates for energy usage during on-peak times and lower rates for energy usage during off-peak times. Other dynamic rate scenarios include critical peak pricing, day ahead hourly rates and even real time rates based on wholesale electric rates charged by the Utilities, Regional Transmission Organizations (RTO)/Independent System Operators (ISO). As a result, consumers are provided with an incentive to use electricity at off-peak times rather than on-peak times and to reduce overall energy consumption of appliances at all times. In addition, Utilities, Regional Transmission Organizations (RTO)/Independent System Operators (ISO) and third party aggregators may be willing to provide payments to consumers for short term reductions in load to provide "ancillary services," such as providing additional spinning reserves capacity or frequency regulation.

Utility power systems become "smart" and demand response enabled by employing a head end management system, such as a company or program responsible for monitoring and running a demand response program. This usually requires equipment and time investments by utilities to install automatic meter reading (AMR) systems, advanced metering infrastructure, or other types of "smart" utility meters in each home. AMR systems, for example, provide for automatically collecting and holding consumption, diagnostic, and status data from water meter or energy metering devices (e.g., for water, gas, or electricity) and transferring that data wirelessly to a meter reader when queried by the meter reader. Advanced metering infrastructure (AMI) represents the application of networking technology to read and manage meter systems that go beyond AMR. These AMI systems enable remote and automatic reading of the meter data and transmitting it back to a central database for billing, troubleshooting, and analysis. In addition the AMI system can remotely disconnect meters as well as report outages when meters are no longer responding due to a localized power failure. The meters in an AMI system are often referred to as "smart meters," since they can use and analyze the collected meter data based on programmed logic.

Smart grid applications improve the ability of electricity producers and consumers to communicate with one another and make decisions about how and when to produce and consume power. Demand response (DR) technology, for example, allows customers to shift from an event based demand response where the utility requests the shedding of load, towards a more 24/7 based demand response where the customer sees incentives for controlling load all the time, such as in providing "Ancillary Services." One advantage of a smart grid application is time-based pricing. Customers who traditionally pay a fixed rate for kWh and kW/month can set their threshold and adjust their usage to take advantage of fluctuating prices. Another advantage, is being able to closely monitor, shift, and balance load in a way that allows the customer to save peak load and not only save on kWh and kW/month, but also be able to trade what they have saved in an energy market. Similarly the smart grid will allow customers to be paid for supplying Ancillary Services—short term reductions in load to provide grid stability due to fluctuating generation sources (such as solar and wind capacity) as well as normal grid stability needs. However, this involves sophisticated energy management systems, incentives, and a viable trading market.

When TOU or DR events are ended, it is possible that a number of users turning appliances on at the same time can create an initial influx of power that is up to several times the normal load on a power grid. This initial influx could compromise a power grid as well as cause it to be fully loaded, and thus, cause a reduction or shut off in power temporarily (e.g., brown outs or black outs). In addition, expenditures to run outside "peak" plants are costly and may not be as environmentally friendly.

Therefore, there is a need to provide an improved system that can enable control when power consuming devices are started after and/or before a DR event or TOU event, and thus, provide incentive for discretional power use to be moved into the off-peak timeframe so consumers can balance their level of comfort with a desired savings amount.

SUMMARY

The present disclosure enables energy consumers to maintain comfort, reduce and shift energy usage and costs by providing methods, systems and devices for appliances and other home loads such as HVAC (Heating Ventilation and Air Conditioning) systems, pool pumps, electric vehicle charging, etc.

In one embodiment, an energy management system for a home network comprising managed energy consuming devices respectively drawing different amounts of power in a home is provided. The energy management system is a home energy manager system comprising a central controller or central device controller with a memory. The controller is in communication with the managed energy consuming devices that respectively comprise a device controller. At least one power/energy measuring devices is in communication with the controller and the managed devices and configured to provide a total energy/power consumption measurement for the home and a power/energy consumption measurement for each managed device. A user interface is communicatively coupled to the central controller for providing user information and receiving user commands thereat. The central controller has a processor and at least one transceiver and is configured to monitor and control energy consumption of each of the managed devices and respective components thereof by sending communications to each of the managed devices via the device controller respectively. The central controller provides real time feedback to the user interface display with respect to natural resource use and generation occurring at the home.

According to one aspect, an energy management system and method for one or more appliances comprises a controller for managing power consumption within a household or other structure. The controller is configured to receive and process a signal indicative of one or more energy parameters of an associated energy supplying utility, including at least a peak demand period or an off-peak demand period or other needs such as load reduction for grid stability. The controller is configured to communicate, control and/or operate one or more appliances in one of a plurality of operating modes, including at least a normal operating mode and an energy savings or deferral mode in response to the received signal. The one or more appliances operate in the normal operating mode during the off-peak demand period and operate in the energy savings or deferral mode during the peak demand period. The controller is configured to control the transition of the one or more appliances to the normal operating mode and energy savings or deferral mode before the peak demand period begins and after the peak demand period is over based on inputs provided by a user.

In another embodiment, a flow meter of an energy management system is configured to measure a flow of natural gas and/or water consumption and a solar generation device having a solar power/energy measuring device operatively coupled to a central controller. A thermostat controller is coupled to the central controller that is configured to be modified via a client application coupled to the central controller and provide consumption data to the user via a user interface of a client application.

DETAILED DESCRIPTION

Figure 1:
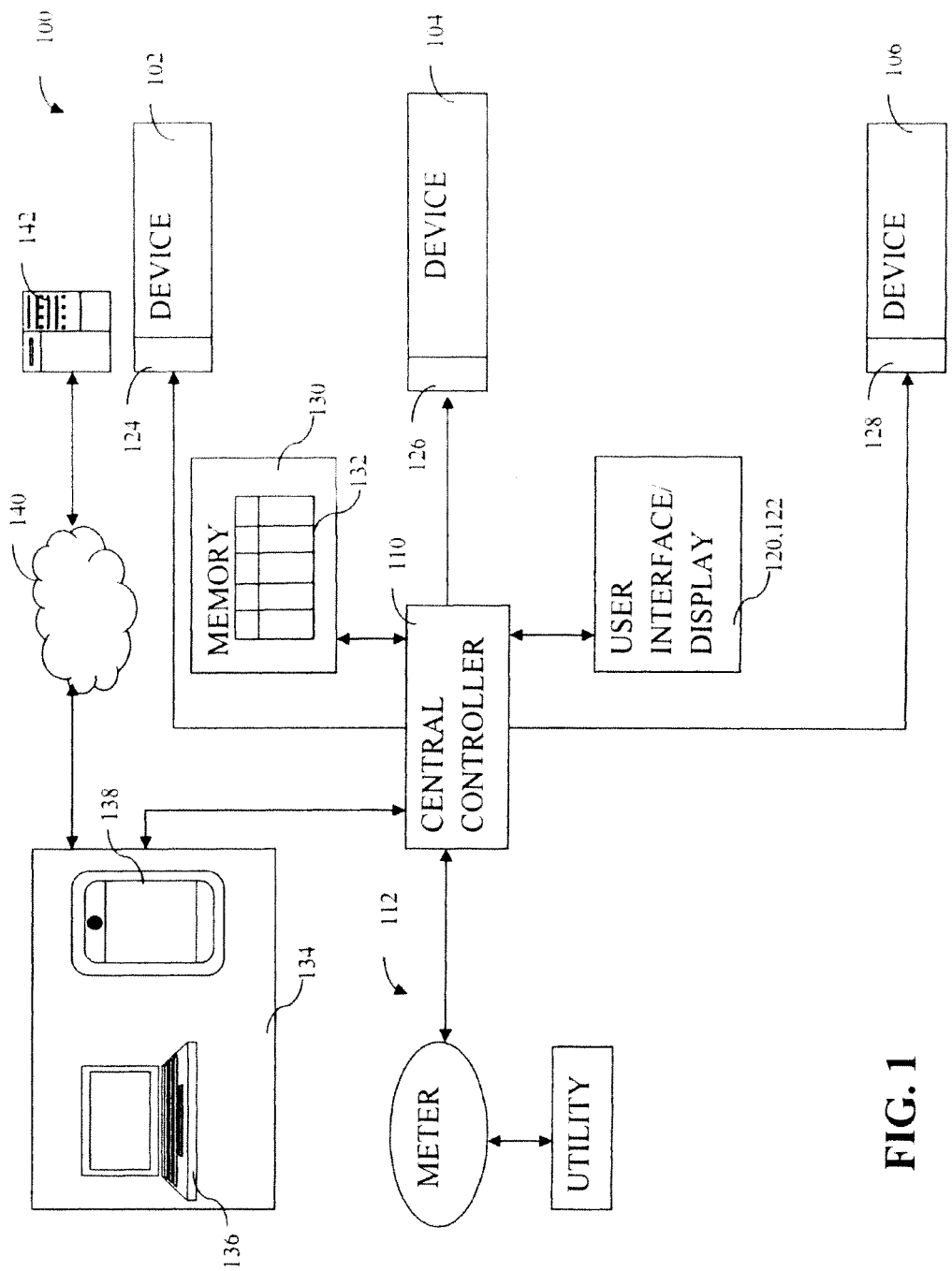
FIG. 1 is a schematic illustration of an energy management system with one or more devices in accordance with exemplary aspects of the present disclosure.

A central controller of an energy management system, such as a home energy manager, provides homeowners the means to monitor and manage their energy consumption through a combination of behavior modification and programmed control logic. The central controller provides feedback on electricity, water, and natural gas consumption, storage of energy at the home, as well as providing data on renewable energy generation occurring at the home, such as solar photovoltaic generation, wind generation, or any other type of renewable generation. This data is presented to a user via a web browser on the homeowner's networked personal computer, mobile device, or any other client device in a client interface.

For example, the central controller provides home data through an application programming interface (API), such as for a web based application or application on a client device. The central device operates as a data server for providing data in a client application, which in turn can be used to present that data to the consumer client, such as in graph form with data of historical/present energy usage, generation and/or storage data. The API generates graphs of energy usage, generation and/or storage on a client device, such as a personal computer, smart phone or any other remote device in communication with the controller.

In another example, data pertaining to the consumer's energy consumption, generated energy, and/or storage is displayed on a user display (e.g., LCD touch screen display) to present and receive data through a web browser on the homeowner's networked PC, or mobile phone. For example, energy usage, generation, and/or storage data is displayed on the device's user display (e.g., LCD touch screen display) and through a web browser on the homeowner's networked PC, mobile phone, or other device in communication with the central controller.

In one embodiment, a ZigBee radio operating as a communication device is implemented to facilitate communicate signals between the central controller and devices within the home, while a second radio operates similarly between the central controller and the utility meter, such as for demand response event signals/price signals. Any communication protocol can be implemented and the present disclosure is not limited to ZigBee as one of ordinary skill in the art will appreciate. The central controller therefore is operable as a gateway by caching or storing information from devices within a home, such as information pertaining to whether smart appliances are on or off, or demand response information from the utility. The central device therefore provides the necessary information from the utility to the appliances/appliance microcontrollers for them to operate in accord with the utility signals and/or user preferences while aggregating home data about the home and energy use.

Consumption data is measured via sensors located at each of the incoming residential utility meters (e.g., water, gas, electrical meters), as well as any on premises generation systems such as wind or solar photovoltaic. This data is collected by radio modules and transmitted wirelessly back to the central device and/or to an energy provider. Alternatively, the radio modules comprise a power line transceiver sending information to and from each sensor or power/energy measuring device, each appliance and an energy provider, for example.

The central device is designed to accommodate multiple methods of wireless communication. This enables the central device to communicate with the radio modules and also access information from the Internet. The central device has the following wireless capability: 802.11 WiFi, FM receiver, and 802.15.4 compliant "ZigBee" radios. However, there are several ways to accomplish this communication, including but not limited to power line carrier (PLC) (also known as power line communication), FM, AM SSB, WiFi, ZigBee, Radio Broadcast Data System, 802.11, 802.15.4, etc.

The central controller is located at the consumer's home, such as with a home energy manager (HEM), for example, and gathers all home data with respect to energy at the home. For example, energy use, generation, and/or storage information is gathered and stored in a home database in a memory of the controller. All of the home data is merged together within the database in order to model an energy profile and a carbon footprint of the consumer's home. Consumers are therefore able to monitor energy of their homes, and the energy management system is operable to then make recommendations to the consumers, such as improving windows, attic insulation, and other such recommendations for reducing energy use and an amount of carbon being produced by any one home. Suppliers for energy efficient products regarding reduced usage, generation and/or storage are also made available to the consumer online over an IP connection.

The energy management system is further designed to integrate with the electrical utilities' push towards Demand Side Management (DSM), also known as Demand Response (DR). The central device is capable of receiving electricity rates and schedules from the utility and using that information to implement pre-determined load shedding behavior across the whole home electrical load.

FIG. 1 schematically illustrates an exemplary home energy management system 100 for one or more energy consuming devices, such as devices 102, 104, 106 according to one aspect of the present disclosure. Each of the devices 102, 104, 106 can comprise one or more power consuming features/functions. For example, device 104 can be a refrigerator, an HVAC system, and/or any energy consuming device capable of having power consumption measured thereat. The devices may also be controllers, or other energy consuming devices other than appliances or in some cases on site electric generation or storage devices. The home energy management system 100 generally comprises a central device or central controller 110 for managing power consumption within a household. The controller 110 is operatively connected to each of the power consuming features/functions. The controller 110 can include a micro computer on a printed circuit board, which is programmed to selectively send signals to a device control board 124, 126, 128 of device 102, 104, and/or 106 respectively in response to the input signal it receives. The device controller, in turn, is operable to manipulate energization of the power consuming features/functions thereof.

The controller 110 is configured to receive a utility signal 112 by a receiver and process the signal indicative of one or more energy parameters and/or a utility state of an associated energy supplying utility, for example, including availability and/or current cost of supplied energy or prices/signals related to Ancillary Services such as spinning reserve or frequency regulation. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by a utility provider, such as a power company or energy provider, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state/period and a relative low price or cost is typically associated with an off-peak demand state/period.

The controller 110 is configured to communicate to, control and operate the devices 102, 104, 106, which comprise appliances and/or thermostats controllers (e.g., a programmable communicating thermostat) in one of a plurality of operating modes, including at least a normal operating mode and an energy savings or deferral mode in response to the received signal. Specifically, each device 102, 104, 106 can be operated in the normal operating mode during the off-peak demand state or period and can be operated in the energy savings or deferral mode during the peak demand state or period. Similarly the appliances can respond to signals related to providing Ancillary Services. As will be discussed in greater detail below, the controller 110 is configured to communicate with each device and/or appliance to precipitate the return of the devices to the normal operating mode after the peak demand period is over.

If the controller 110 receives and processes an energy signal indicative of a peak demand state or high energy price or period at any time during operation of the appliances 102, 104, 106, the controller makes a determination of whether one, more, or all of the power consuming features/functions of each appliance should be operated in the energy savings mode and if so, it signals the appropriate device to begin operating in the energy savings or deferral mode in order to reduce the instantaneous amount of energy being consumed. The controller 110 is configured to communicate with the appliance control board 124 thru 128 to provide command instructions for the appliance control board to govern specific features/functions, for example, to operate at a lower consumption level or defer operation and determine what the lower consumption level should be. This enables each appliance to be controlled by the appliance's controller where user inputs are being considered directly, rather than invoking an uncontrolled immediate termination of the operation of specific features/functions of an appliance from an external source, such as a utility. It should be appreciated that the controller 110 can be configured with default settings that govern normal mode and energy savings mode operation. Such settings in each mode can be fixed, while others are adjustable to user preferences to provide response to load shedding signals.

In one embodiment, the central controller 110 transmits signals received from the utility (via smart meter or other means) along to devices 102, 104, and 106 connected to a home area network (HAN). The central controller 110 manages which devices shed load by entering into an energy savings mode or other power deferred state and collects information about the home in a home database in the memory. The data is further compiled into an aggregate home database having home data of multiple homes. The aggregate home database that can be collected and stored in the controller's memory on-site via a query for public home data or from a private database of home data for homes sharing such information.

The controller 110 may include a user interface 120 having a display 122 and control buttons for making various operational selections. The display can be configured to provide active, real-time feedback to the user on the cost of operating each appliance 102, 104, 106. The costs are generally based on the current operating and usage patterns and energy consumption costs, such as the cost per kilowatt hour charged by the corresponding utility. The controller 110 is configured to gather information and data related to current energy usage patterns, energy generation and/or storage data. A carbon footprint is calculated together with an energy profile of the home based on the characteristics of the utility generation mix and other fuels (such as natural gas) consumed by the home. This information can be used to determine current energy usage and cost associated with using each device/appliance in one of the energy savings mode and normal mode as well as provide information from a web browser of suppliers able to provide energy reduction devices, information to save on energy usage, increase generation at the home, improve storage, and/or other savings tips for the home including tips for making changes to the home based on demographic information and home data. This real-time information (i.e., current usage patterns, and/or current power cost) can be presented to the user via the display.

Home data is merged together by the device controller 110 acting as the central brain for the system and includes information about construction specifications, such as geographical location, home age, size, insulation information, appliances within the home, a number of rooms, an orientation of the home obtained from good map info, for example, and/or other public and/or private residence data pertaining to the home. Private residence data includes past utility bills, HVAC/appliance, size, ratings, home expansion data, window orientation, number of floors, number of residents, and/or any other type of private data related to energy usage of the home. Other data affecting the home stored in a home data base includes meteorological data, such as temperature, solar insolation data, precipitation, geographical weather and/or wind patterns, for example. Utility data pertaining to the home is also considered as home data gathered by the controller 110. Utility data includes information about usage/cost history, the generation of CO2 by the utility generation mix or other emissions caused by the home, and/or data for similar residences having data available for comparison. The user display 122 has a user interface 120, which may be a web based application interface that presents all home data including current energy consumption, historical energy consumption, thermostat set points and schedule, weather forecast information for determining optimal times to run certain devices, generate energy on-site, and/or store energy to the energy consumer/user of the home.

In one embodiment, the central controller 110 operates as a data server embodied in a client application (not shown). The central controller 110 provides data received from devices within the home to the client application, which in turns formats the data to be presented to the user, such as in graphs or other type of displays. In another embodiment, the controller 110 operates as a web server for serving web based applications to a browser device and/or a sending interface over an IP connection for a web based application.

The controller 110 communicates to the sensor radios via one or more wireless radios. The interface radios are ZigBee (802.15.4), WiFi (802.11), and an FM receiver. The device controller 110 can also include ports, such as USB or Ethernet for adding additional functionality.

In one embodiment, the controller 110 connects via either Ethernet or WiFi to the homeowner's router and to a client application 134 in a personal computer 136 and/or a mobile device 138 to access the Internet 140 of FIG. 1. This allows for remote service and monitoring capability. A server 142 can keep records of all homes therein that may be accessed remotely via the internet.

In one embodiment, the central controller 110 compiles an energy profile and carbon footprint, such as graphs from home data stored within the table 132 of memory 130 with a home database for the individual home. The home database of memory 130 is operable to be updated via the user interface 120 with demographic information regarding the number, age, sex, and income of the residents as well as information about the occupancy patterns, an other personal preferences related to the home. A carbon footprint is the total set of greenhouse gases (GHG) emissions associated with activities of an organization, event or product. For simplicity of reporting, it is often expressed in terms of the amount of carbon dioxide, or its equivalent of other GHGs, emitted. An individual, nation, or organization's carbon footprint can be measured by undertaking a GHG emissions assessment. Once the size of a carbon footprint is known, a strategy can be devised to reduce it, e.g. by technological developments, better process and product management, changed Green Public or Private Procurement (GPP), Carbon capture, consumption strategies, and others. The mitigation of carbon footprints through the development of alternative projects, such as solar or wind energy or reforestation, represents one way of reducing a carbon footprint and is often known as carbon offsetting.

The energy profile and carbon foot print of the home is based on home data, such as physical and demographic data about the individual's home. For example, home data comprises data such as a geographical location, as determined by GPS, for example, size (e.g., square footage), number of floors/rooms, age/year of construction, and an orientation of the home as provided by a mapping application (e.g., google mapping applications), on-site generation data and/or other public/private residence data. Home data further includes meterological data including local temperatures, precipitation, solar insolation data, and wind trends. Utility data is also compiled, such as historical energy consumption and cost history information, emissions of carbon dioxide by the utility generation mix or other emission data for the given home, and usage for homes that are similar based on similar construction age, size, orientation and/or other physical and demographic data about the home.

The individual home data is compiled into an aggregate home data base for multiple homes for a comparison to be made with the consumer's individual home and other similar type homes. The comparison results are presented to the user in a web browser or a client application 134, for example, on a client device. The aggregate home data base could be stored on-site in the memory controller and/or the server 142. The comparison results of similar homes are used to make recommendations to the consumer of the home for saving energy costs and/or reducing the carbon footprint. The recommendations include cost savings, payback benefits, financing options, local supplier information, on-site generation methods and/or devices for reducing cost, carbon, and/or other emission associated with energy usage at the home. For example, products/services for reducing energy costs/CO2 emissions can be provided, such as upgraded appliances suggestions, hot water and/or lighting upgrades. Other examples include HVAC upgrades or repairs, geothermal, solar thermal methods, on site generation methods, such as photovoltaic solar panels, wind, natural gas, fuel cell options, etc. that are available online or locally. Improvements such as building shell improvements are recommended. For example, insulation types, windows, and other physical construction upgrade possibilities that may be of benefit to the consumer. Energy storage systems are presented that comprises battery, hot water or cold storage methods. Energy audit services are also suggested for the local area for improving cost, efficiency, and/or carbon offsetting.

Recommendations are provided for reducing overall net energy consumption and approaching a net zero energy condition. The evaluation would include recommendations regarding energy reduction and addition of on-site power generation and/or storage at the home. The recommendations are based on at least one of the comparison of similar type homes, age, geographical location, cost, home construction efficiency, resident demographic data, past utility billing information, total power/energy consumption of the home, power/energy consumption of individual energy consuming devices at the home, generation produces available, and/or storage products available. A net zero energy consumption is when a home has a source of in-home generation or storage and generates as much energy at the home as is consumed over the course of a time period, such as a year. For example, recommendations provided to the home owner could provide the energy usage amounts over time to the user with generation data. If generation data is less than the amount consumed, options available will be provided to improve any number of the characteristics making up the home's profile to increase efficiency, cost and/or generation of energy. For example, age of the home may indicate that new windows could be provided by a certain local supplier suggested that would increase insulation by an amount to offset cost and the carbon footprint made by the home. Other products/services/suppliers could be provided that are available to the user, such as newly marketed flexible solar panels, or increased efficiency solar panels, geothermal devices, on site fuel cells, windmills, etc.

Different measuring devices for various types of sources of energy. The HEM system 100 communicates wirelessly, for example, to radios that are connected to various sensors. Measurement of electricity includes at least a power meter, for example, and a wireless radio module.

In another embodiment, the home can be outfitted with a "smart" electric meter as the meter or other meters in the system, for example. This meter wirelessly communicates directly with the central device controller 110. The home's "smart" meter can be configured to establish a communication link for communicating a signal based on any natural resource consumption, and generation, such as for electrical, water, or gas. This communication is sent to the radio module. In another embodiment, the electric utility can directly send the consumption data to the central device 110 via the Internet 140, rather than the meter.

In one embodiment, the water utility can directly send the consumption data to the central device controller 110 via the Internet or IP connection 140. For example, a natural gas measurement includes a natural gas flow meter and/or a wireless radio module. The gas meter is inserted into the home's incoming gas line. In addition, the gas utility can directly send the consumption data to the central device controller 110 via the Internet 140.

In another embodiment, an HVAC controller may be a standard home thermostat used to program temperature set points and schedules for the HVAC systems. This controller could contain a radio module in order to communicate schedule and temperature information with the central device. Local utility and rate information is also broadcast from the utility or energy provider to the controller 110 directly. The controller 110 can receive rate and schedule information as well as demand side management DSM signals to pass them on to the household appliances.

The controller 110 further comprises a memory 130 having at least table 132 of FIG. 1 that collects energy consumption, generation and/or storage data for a home or other structure (e.g., warehouse, business, etc.). The table comprises variables associated with the heating and cooling conditions of the home, for example. A table could be generated for each device and any given operating mode that includes historical home data and data that is currently updated, which may be used in a client application of a client device, such as a computer or mobile phone, for presenting graphs or other data to the user.

The duration of time that each device 102, 104, 106 operates in the energy savings mode may be determined by information in the energy signal. For example, the energy signal may inform the controller 110 to operate in the energy savings mode for a few minutes or for one hour before a DR event, at which time each device 102, 104, 106 returns to normal operation. Once transmission of the signal has ceased, each appliance returns to normal operating mode. In yet another embodiment, an energy signal may be transmitted to the controller 110 to signal each device 102, 104, 106 to operate in the energy savings mode. A normal operation signal may then be later transmitted to the controller to signal each device 102, 104, 106 to return to the normal operating mode.

The operation of each device 102, 104, 106 may vary as a function of a characteristic of the utility state and/or supplied energy. Because some energy suppliers offer time-of-day pricing in their tariffs, price points could be tied directly to the tariff structure for the energy supplier. If real time pricing is offered by the energy supplier serving the site, this variance could be utilized to generate savings and reduce load demand. Similarly, if pricing is available for ancillary services, such as providing spinning reserve or frequency regulations, the loads and generation sources in the home may respond in a manner to generate savings for customers.

In one embodiment, the system 100 has the capability for remote software upgrades and bug fixes. For example, if a software bug is found, this feature will allow for it to be fixed quickly and in a very cost effective manner. The system 100 has the capability for the homeowner to log onto a secure IP connection and interface to their system via a portal, for example. This will allow consumers additional flexibility to monitor their home while away.

Figure 2:
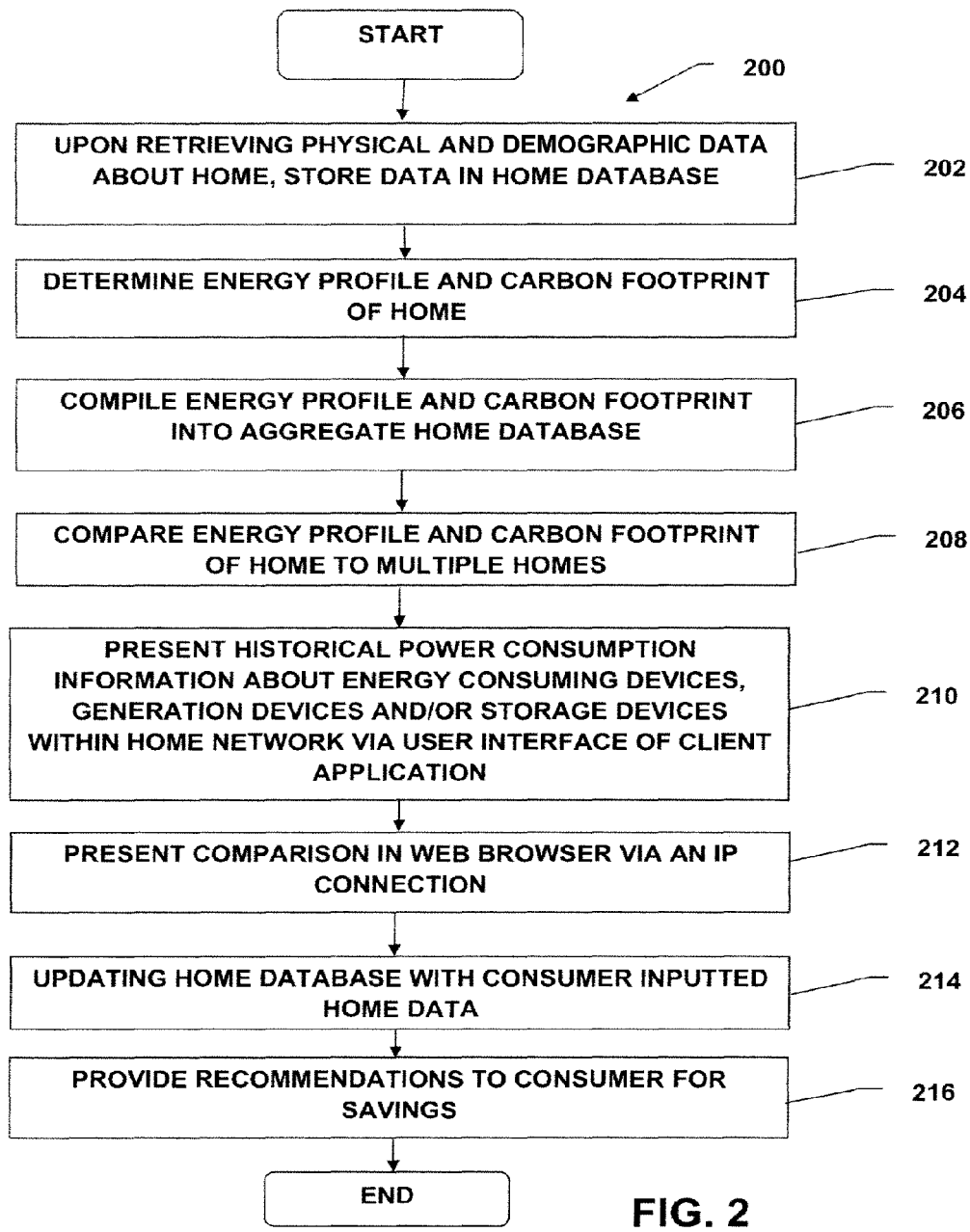
FIG. 2 is a flow diagram illustrating an example methodology for an energy management system.

FIG. 2 illustrates an exemplary method 200 for managing energy of a structure (e.g., a residential home, or a business). While the method 200 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 200 begins at start. At 202 physical and demographic data, as discussed above, are retrieved and upon retrieval, the data is stored in a home data base. At 204 an energy profile and carbon footprint is determined. The energy profile and carbon footprint demonstrate the energy usage of the home with geographic location and physical construction characteristics. For example, a total energy consumption of the home is received including a natural resources consumption comprising gas, electricity-based on utility generation mix, and water of the home, and an energy consumption of individual devices within the home. Energy generation and storage data at the home also make up the energy profile of the home and affect the carbon footprint based upon the nature of the on site generation or storage characteristics.

At 206 the energy profile and carbon footprint of the home is compiled into an aggregate home database having home data for other homes. The aggregate database stores data for multiple homes. At 208 the energy profile and carbon footprint of the home is compared with the data of other homes in the aggregate database in order to give recommendations for improving savings, efficiency and the carbon footprint of the home.

At 210 historical power consumption information is presented to the user about energy consuming devices, generation devices and/or storage devices within a home network via a user interface of a client application. For example, a user's cell phone can present such information to the user. At 212 comparison results are presented in a web browser via an IP connection. The home database is updated with consumer inputted home data that includes demographic information regarding the number, age sex and income of residents of the home as well as information regarding occupancy patterns and other personal preferences at 214. At 216 recommendations are provided to a consumer that comprise cost savings, payback benefits, financing options, local suppliers and on-site home generation methods and/or devices for reducing cost, carbon, and/or other emissions associated with the home.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method of an energy smart management system for providing advice and recommendations to an energy consumer regarding energy use in a home that has a controller with at least one memory for storing data and executable instructions, the method comprising:

upon retrieving physical and demographic data of the home, past energy consumption characteristics, and on-site generation /storage data, storing the data in a home database;

determining an energy profile and a carbon footprint of the home based on the physical and demographic data of the home and utility generation mix characteristics;

compiling the energy profile and the carbon footprint into an aggregate home database having home data for multiple homes respectively;

comparing the energy profile and the carbon footprint of the home in relation to the multiple homes; and presenting the comparison of the energy profile and the carbon footprint of the home in a web browser for the consumer via an IP connection;

wherein the borne data includes meteorological data comprising local temperature, precipitation, solar insolation data, and wind trends, and construction data comprising geographical location, size, number of floors and/or rooms, age, and orientation of the home with respect to the sun.

2. The method of claim 1, wherein presenting the comparison of the energy profile and the carbon footprint of the home comprises presenting products targeted to geographic and weather conditions of a location of the home for improving cost, efficiency and/or carbon offsetting.

3. A method of an energy smart management system for providing advice and recommendations to an energy consumer regarding energy use in a home that has a controller with at least one memory for storing data and executable instructions, the method comprising:

upon retrieving physical and demographic data of the home, past energy consumption characteristics, and on-site generation/storage data, storing the data in a home database;

determining an energy profile and a carbon footprint of the home based on the physical and demographic data of the home and utility generation mix characteristics;

compiling the energy profile and the carbon footprint into an aggregate home database having home data for multiple homes respectively;

comparing the energy profile and the carbon footprint of the home in relation e multiple homes;

presenting the comparison of the energy profile and the carbon footprint of the home in a web browser for the consumer via an IP connection;

updating the home database with consumer inputted home data including demographic information regarding the number, age, sex and income of residents as well as information regarding occupancy patterns and other personal preferences; and providing recommendations to the consumer comprising cost savings, payback benefits, financing options, local suppliers, and on site home generation methods and/or devices for reducing cost, carbon and/or other emissions associated with the home.

4. The method of claim 3, wherein the recommendations comprise home construction tips, appliance saving tips and/or upgrades, on-site generation methods, and storage methods for improving cost, efficiency and/or carbon offsetting.

5. A method of an energy smart management system for providing advice and recommendations to an energy consumer regarding energy use in a home that has a controller with at least one memory for storing data and executable instructions, the method comprising:

upon retrieving physical and demographic data of the home, past energy consumption characteristics, and on-site generation/storage data, storing the data in a home database;

determining an energy profile and a carbon footprint of the home based on the physical and demographic data of the home and utility generation mix characteristics;

compiling the energy profile and the carbon footprint into an aggregate home database having home data for multiple homes respectively;

comparing the energy profile and the carbon footprint of the home in relation to the multiple homes; and presenting the comparison of the energy profile and the carbon footprint of the home in a web browser for the consumer via an IP connection;

wherein the energy profile and the carbon footprint provide recommendations for creating a net zero energy consumption including power generation/storage at the home based on at least one of the comparison, age, geographical location, cost, home construction efficiency, resident demographic data, past utility billing information, total power/energy consumption of the home, power/energy consumption of individual energy consuming devices at the home, generation products available, and storage products available.

6. The method of claim 5, wherein the energy profile and the carbon footprint are based at least partially on geographical and construction data of the home collected over time.

7. The method of claim 5, further comprising:

receiving, a total energy consumption of the home including a natural resource consumption comprising gas, electricity, and water of the home, and an energy consumption of the energy consuming devices within the home, generation data for natural resources generated at the home, and storage data from energy storage devices at the home for the energy profile and the carbon footprint presented.

8. The method of claim 5, wherein the carbon footprint comprises an amount of emissions caused by the home based on natural resources consumed including electricity, natural gas, oil, and/or water, energy consumption, an amount being generated onsite of the home, and an amount of emission offset endeavors being provided on-site of the home.

9. The method of claim 5, wherein the comparison of the energy profile and the carbon footprint of the home is presented in a consumer application in a mobile phone or a personal computer.

* * * * *